B. ATWOOD.
Improvement in Mowing-Machines.
No. 127,730. Patented June 11, 1872.
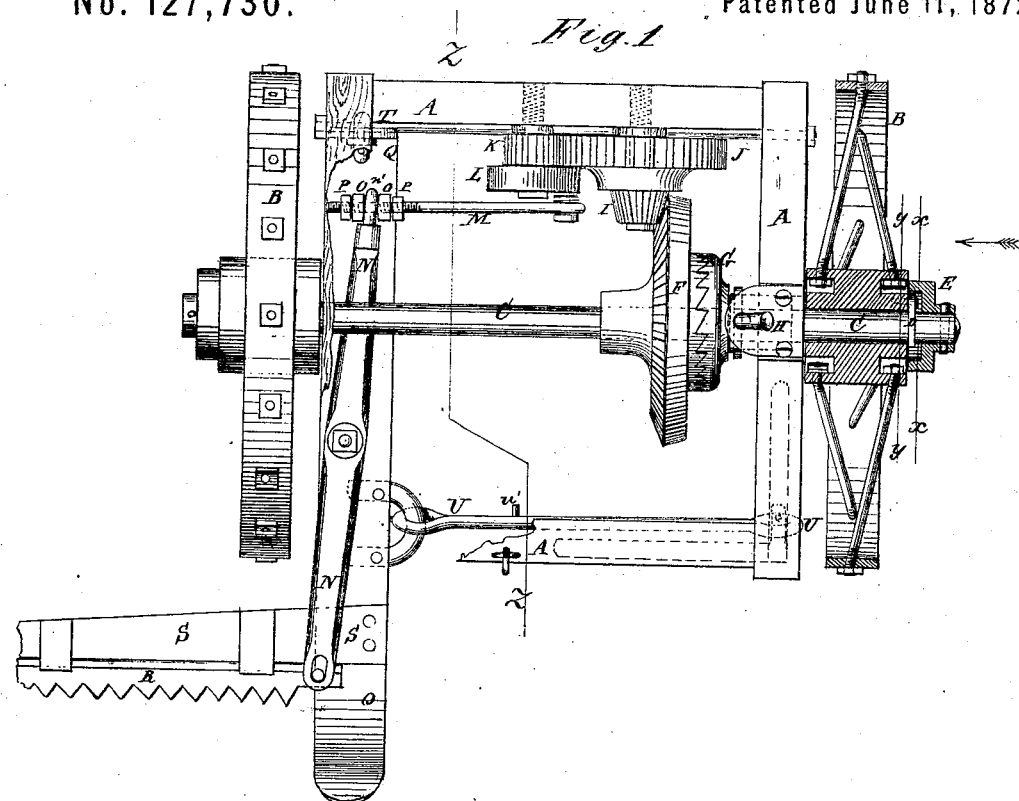
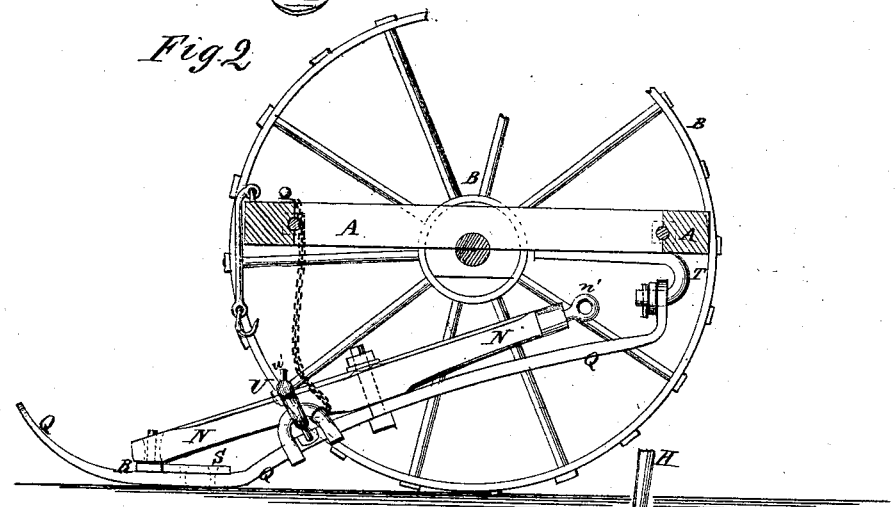
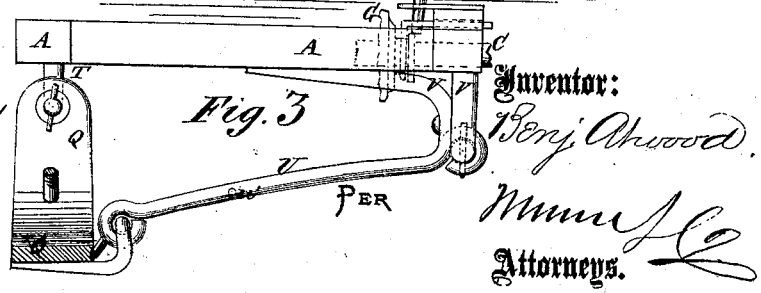
Witnesses:
A. W. Almquist
Francis McArdle
Inventor:
Benj. Atwood
per Munn & Co.
Attorneys.

127,730

UNITED STATES PATENT OFFICE.

BENJAMIN ATWOOD, OF STANSTEAD, CANADA.

IMPROVEMENT IN MOWING-MACHINES.

Specification forming part of Letters Patent No. 127,730, dated June 11, 1872.

Specification describing a new and useful Improvement in Reapers and Mowers, invented by BENJAMIN ATWOOD, of Stanstead, in the county of Stanstead, Province of Quebec, and Dominion of Canada.

Figure 1 is a top view of my improved machine, parts being broken away to show the construction. Fig. 2 is a detail sectional view taken through the line $z\ z$, Fig. 1. Fig. 3 is a detail front view of the same, parts being removed to show the construction.

Similar letters of reference indicate corresponding parts.

My invention has for its object to furnish an improved reaper and mower which shall be simple in construction, light, strong, and durable, not liable to get out of order, will readily adapt itself to inequalities of the surface of the ground and pass over obstructions, and which shall have very light side draft; and it consists in the construction and combination of the various parts of the machine, as hereinafter more fully described.

A is the frame of the machine, which is made of wood, and to which the various parts of the machine are attached. B are the wheels, which are placed upon the journals of the axle C, which revolves in bearings attached to the frame A. To the outer ends of the hubs of the wheels B are pivoted spring-pawls D, which take hold of the ratchet-teeth formed upon the inner surface of the inwardly-projecting flange of the caps E, which are placed upon the end of the axle C, and are secured to said axle by a pin or bolt so as to be carried with said axle in its revolution. F is a bevel-gear wheel, which revolves loosely upon the axle C and which has ratchet-teeth formed upon its outer side, upon which the ratchet-teeth of the clutch G take hold, so that the axle C may be made to carry the said gear-wheel F with it in its revolution, when desired. The clutch G is operated by a lever, H, pivoted to the frame A, and which projects upward into such a position as to be conveniently reached and operated by the driver. The teeth of the gear-wheel F mesh into the teeth of the small bevel-gear wheel I formed solidly upon or rigidly attached to the side of the gear-wheel J, which revolves upon a gudgeon detachably attached to the rear cross-bar of the frame A. The teeth of the gear-wheel J mesh into the teeth of the gear-wheel K, which revolves upon a gudgeon detachably attached to the rear cross-bar of the frame A. The wheels I J K with the gudgeons upon which they revolve, being detachable, render that desirable feature of changeable motion quite efficacious by simply having the said wheels of different sizes. L is a small crank-wheel formed solidly upon or rigidly attached to the gear-wheel K. To the crank-pin of the crank-wheel L is pivoted the end of a connecting-rod or pitman, M. The other or outer end of the connecting-rod M passes through an eye, $n'$, swiveled to the rear end of the lever N. Upon the rod M, upon each side of the eye $n'$ of the lever N, is placed a thick rubber washer, O. The rubber washers O O are supported adjustably in place by nuts P screwed upon the threads cut upon the rod M, and are designed to give the pitman-rod an easy rocking motion in the eye $n'$ without working the swivel-joint, and also to relieve any sudden strain in case of any substance getting into the knives sufficient to instantly stop their motion. The nuts upon the pitman-rod serve to press the rubber washers to the required solidity and make the pitman-rod adjustable in length, thereby securing a true relative position of the knives and guards. The lever N is pivoted near its middle part to the suspension-bar Q. By making the forward arm of the lever N the longer the required throw may be given to the cutters with a small crank-wheel, L. In the forward end of the lever N is formed an eye, slightly elongated upon the upper side to receive a stud formed solidly upon, or rigidly attached to, the inner end of the cutter-bar R, which slides upon the finger-bar S, the inner end of which is rigidly attached to the forward part of the suspension-bars Q. The forward part of the suspension-bar Q is curved, as shown in Fig. 4, to adapt it to serve as a shoe and to pass freely over the ground. Upon the rear part of the suspension-bar Q is formed, or to it is attached, an upwardly-projecting lug to receive a pivot, T, firmly attached to the rear part of the frame A. This construction allows the suspension-bar Q to rock, carrying with it the lever N, finger-bar S, and cutter-bar R, to enable the said finger and cutter bars to conform to irregularities of surface or to pass obstructions. This construction also allows the forward end of the suspension-bar to be raised from the ground to pass obstructions, or to pass from place to place, either with or without the cutter and finger bars being turned up. The side strain upon the suspension-bar Q is sustained by the brace-bar U, one end of which is attached to an eye attached to the forward part of said suspension-bar Q, and its other or upper end is pivoted to a bracket or arm, V, firmly attached to the forward part of the frame A and securely braced. By this construction the brace U will firmly support the suspension-bar Q, and, at the same time, will not interfere with any of the movements of the said bar Q, but will give effect thereto. By this construction also the points of support of the suspension-bar Q and the brace-bar U, being so far away from the cutter-bar, will facilitate the shoe in passing over an uneven surface. Side draft is obviated by drawing from a point considerably to the right of the machine at the point and place where a pin, $u'$, is set in the brace U. This also relieves the natural tendency of the shoe to press downward.

Having thus described my invention, I claim as new and desire to secure by Letters Patent—

The combination of the lever N, suspension-bar Q, and brace-bar U with the frame A and driving-pitman M, substantially as herein shown and described, and for the purpose set forth.

BENJAMIN ATWOOD.

Witnesses:
N. T. SHEAFE,
ALVIN McGUFFEY.